United States Patent
Heumphreus et al.

(10) Patent No.: US 10,254,396 B2
(45) Date of Patent: Apr. 9, 2019

(54) DUE REGARD RADAR SYSTEM

(71) Applicant: The Boeing Company, Chicago, IL (US)

(72) Inventors: Paul R. Heumphreus, Saint Peters, MO (US); Michael K. Martin, Redondo Beach, CA (US); Giovanni Corrao, St. Charles, MO (US); James A. Shifflett, Hazelwood, MO (US); Jamaal H. Granger, St. Charles, MO (US); Roger K. Young, O'Fallon, MO (US); Timothy R. Bristol, Orange, CA (US); Miles E. Newton, Irvine, CA (US)

(73) Assignee: The Boeing Company, Chicago, IL (US)

( * ) Notice: Subject to any disclaimer, the term of this patent is extended or adjusted under 35 U.S.C. 154(b) by 399 days.

(21) Appl. No.: 15/001,438

(22) Filed: Jan. 20, 2016

(65) Prior Publication Data
US 2017/0205505 A1 Jul. 20, 2017

(51) Int. Cl.
| | | |
|---|---|---|
| *G01S 7/03* | (2006.01) |
| *H01Q 1/28* | (2006.01) |
| *G01S 13/02* | (2006.01) |
| *G01S 13/42* | (2006.01) |
| *G01S 13/87* | (2006.01) |
| *H01Q 21/28* | (2006.01) |
| *G01S 13/93* | (2006.01) |
| *B64C 1/36* | (2006.01) |
| *H01Q 21/06* | (2006.01) |

(52) U.S. Cl.
CPC ............... *G01S 13/87* (2013.01); *G01S 7/03* (2013.01); *G01S 13/426* (2013.01); *G01S 13/9303* (2013.01); *H01Q 1/281* (2013.01); *H01Q 21/28* (2013.01); *B64C 1/36* (2013.01); *G01S 13/931* (2013.01); *G01S 2013/0245* (2013.01); *H01Q 21/061* (2013.01)

(58) Field of Classification Search
CPC .......... B64C 1/061; H01Q 1/281; H01Q 1/42
USPC ........................................................ 342/59
See application file for complete search history.

(56) References Cited

U.S. PATENT DOCUMENTS

| | | | | |
|---|---|---|---|---|
| 4,630,053 A | * | 12/1986 | Green, Jr. ............. | G01S 7/4052 342/168 |
| 5,128,683 A | * | 7/1992 | Freedman ............... | G01S 7/032 342/158 |
| 5,227,808 A | | 7/1993 | Davis | |
| 6,366,244 B1 | * | 4/2002 | Fernandes ................. | H01Q 3/14 343/700 MS |
| 6,850,204 B1 | * | 2/2005 | Angelucci ............ | H01Q 1/1207 343/770 |
| 6,891,511 B1 | | 5/2005 | Angelucci | |
| 7,289,079 B2 | | 10/2007 | Rupp et al. | |

(Continued)

FOREIGN PATENT DOCUMENTS

EP 0509843 10/1992

*Primary Examiner* — Frank J McGue
(74) *Attorney, Agent, or Firm* — Walters & Wasylyna

(57) ABSTRACT

A radar system may include a first radar array including a plurality of first radiating elements, and a second radar array including a plurality of second radiating elements, wherein the first radar array and the second radar array include a combined field of coverage of at least ±110 degrees in an azimuth plane and at least ±15 degrees in an elevation plane.

20 Claims, 10 Drawing Sheets

(56) References Cited

U.S. PATENT DOCUMENTS

| | | |
|---|---|---|
| 8,446,323 B2 | 5/2013 | Weidmann et al. |
| 8,854,257 B2 | 10/2014 | Hamner et al. |
| 2003/0122714 A1* | 7/2003 | Wannagot ................ H01Q 1/42 343/700 MS |
| 2008/0169962 A1* | 7/2008 | Rees ........................ H01Q 1/28 342/29 |
| 2016/0003579 A1* | 1/2016 | Stansfield ............. F41G 7/2246 244/3.19 |

* cited by examiner

|  | QUANTITY | UNIT WEIGHT (LBS) | TOTAL WEIGHT (LBS) | UNIT POWER (WATTS) | TOTAL POWER (WATTS) | UNIT COOLING POWER (WATTS) | TOTAL COOLING POWER (WATTS) | WIDTH W1 (IN) | DEPTH D1 (IN) | HEIGHT H1 (IN) | VOLUME (IN³) |
|---|---|---|---|---|---|---|---|---|---|---|---|
| RADAR SYSTEM (100) | 1 |  | 48 |  | 943 |  | 482 |  |  |  | 1452.9 |
| RADAR ARRAY (144) | 2 | 5 | 10 | 357.5 | 715 | 127 | 254 | 10.3 | 5.4 | 3.5 | 386.8 |
| RF ELECTRONICS (162) | 1 | 20 | 20 | 155 | 155 | 155 | 155 | 15 | 6.5 | 6.5 | 633.8 |
| DIGITAL PROCESSOR (164) | 1 | 18 | 18 | 73 | 73 | 73 | 73 | 5.2 | 10 | 8.3 | 432.3 |

FIG. 8

DUE REGARD RADAR SYSTEM

FIELD

The present disclosure is generally related to radar and, more particularly, to a due regard radar system including a pair of radar arrays oriented to provide an overlapping field of coverage.

BACKGROUND

Most modern air vehicles, such as manned and unmanned aircraft, are subject to regulatory requirements to provide due regard sensing of non-cooperative airborne targets (e.g., aircraft not equipped with a transponder) to support sense and avoid functions. Generally, due regard radar is an air-to-air radar that provides the ability to detect and track the airborne target. One problem with providing due regard radar, particularly on relative small aircraft, such as unmanned aircraft, is the inability to meet the size, weight, and/or power limitations of a radar system deployed by the aircraft that capable of providing a field of coverage adequate to meet the regulatory requirements.

Accordingly, those skilled in the art continue with research and development efforts in the field of due regard radar systems.

SUMMARY

In one example, the disclosed radar system may include a first radar array including a plurality of first radiating elements, and a second radar array including a plurality of second radiating elements, wherein the first radar array and the second radar array include a combined field of coverage of at least ±110 degrees in an azimuth plane and at least ±15 degrees in an elevation plane.

In another example, the disclosed aircraft may include an airframe, a first radar array coupled to the airframe, the first radar array including a plurality of first radiating elements, a second radar array coupled to the airframe, the second radar array including a plurality of second radiating elements, and a radome coupled to the airframe, wherein the first radar array and the second radar array are disposed within the radome, and wherein the first radar array and the second radar array include a combined field of coverage of at least ±110 degrees in an azimuth plane and at least ±15 degrees in an elevation plane.

In yet another example, the disclosed method for providing due regard radar may include the steps of: (1) orienting a first centerline of a first radar array and a second centerline of a second radar array at an angle of 110 degrees in an azimuth plane relative to one another, (2) providing a combined field of coverage of at least ±110 degrees in the azimuth plane and at least ±15 degrees in an elevation plane, and (3) providing an overlapping field of coverage of at least ±5 degrees in the azimuth plane.

Other examples of the disclosed apparatus and method will become apparent from the following detailed description, the accompanying drawings and the appended claims.

BRIEF DESCRIPTION OF THE DRAWINGS

FIG. 8 is one example of a size, weight, power, and cooling requirements table for the disclosed radar system;

DETAILED DESCRIPTION

Figure 1:
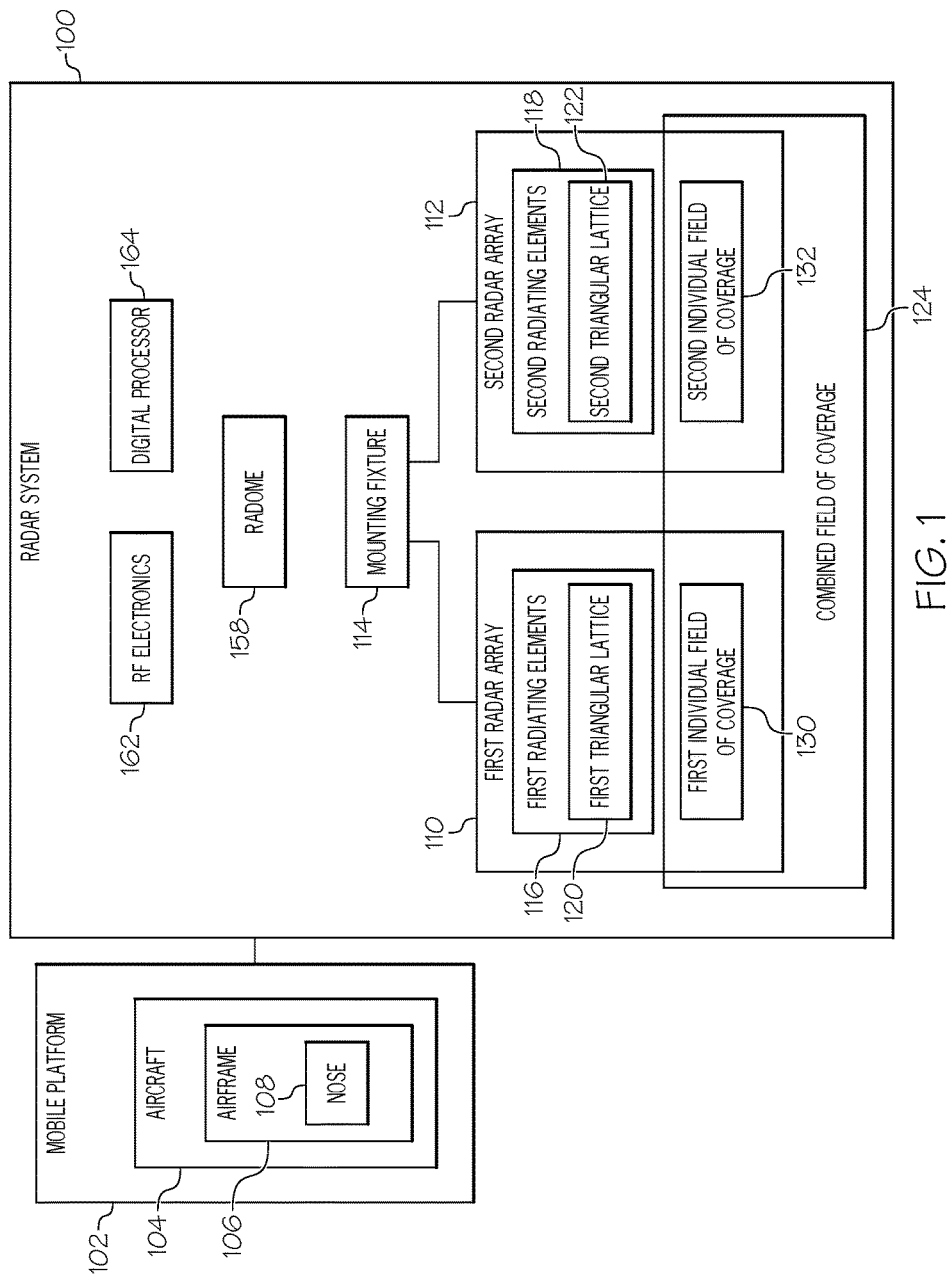
FIG. 1 is a schematic block diagram of one example of the disclosed radar system.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Figure 15:
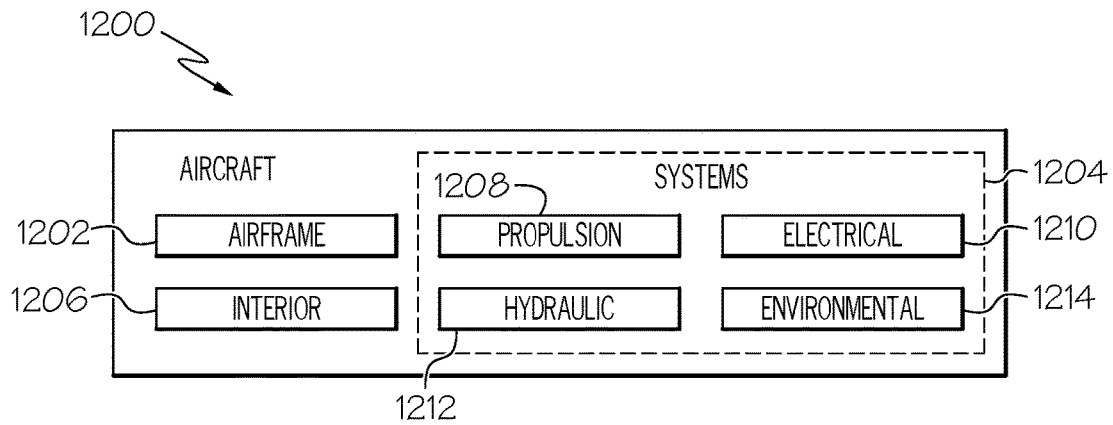
FIG. 15 is a schematic illustration of an aircraft.

In FIGS. 1 and 15, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 15 may be combined in various ways without the need to include other features described in FIGS. 1 and 15, other drawing figures, and/or the accompanying disclosure, even though such combination or combinations are not explicitly illustrated herein. Similarly, additional features not limited to the examples presented, may be combined with some or all of the features shown and described herein.

Figure 13:
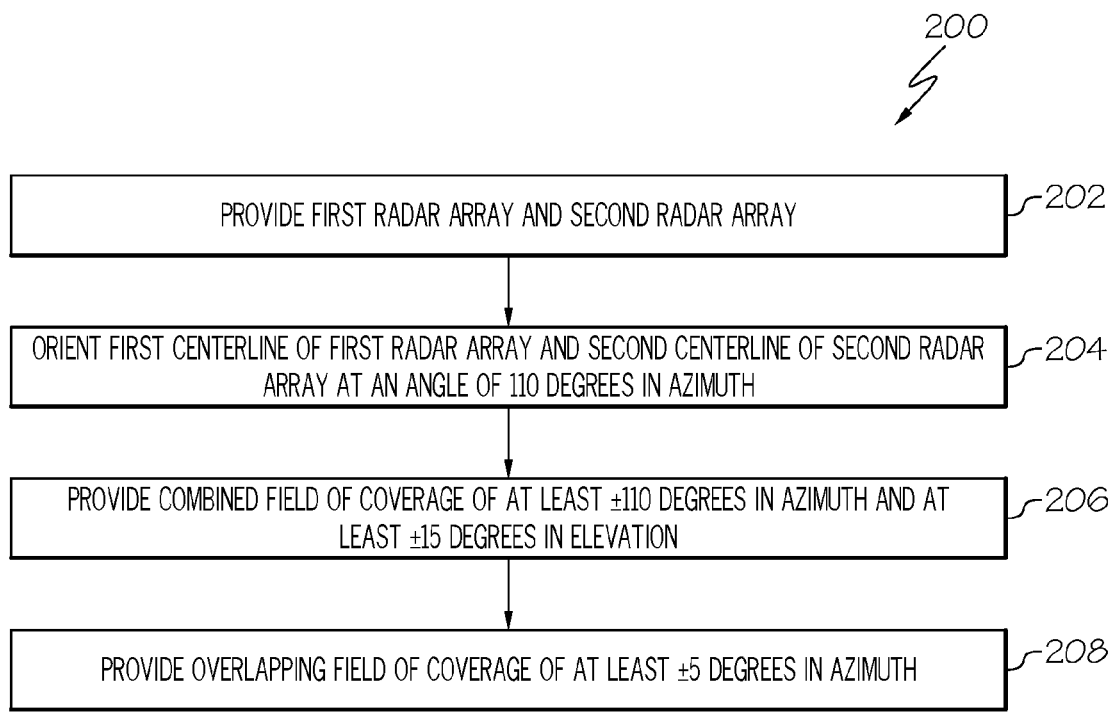
FIG. 13 is a flow diagram of one example of the disclosed method for providing a due regard sense and avoid radar signal.
Figure 14:
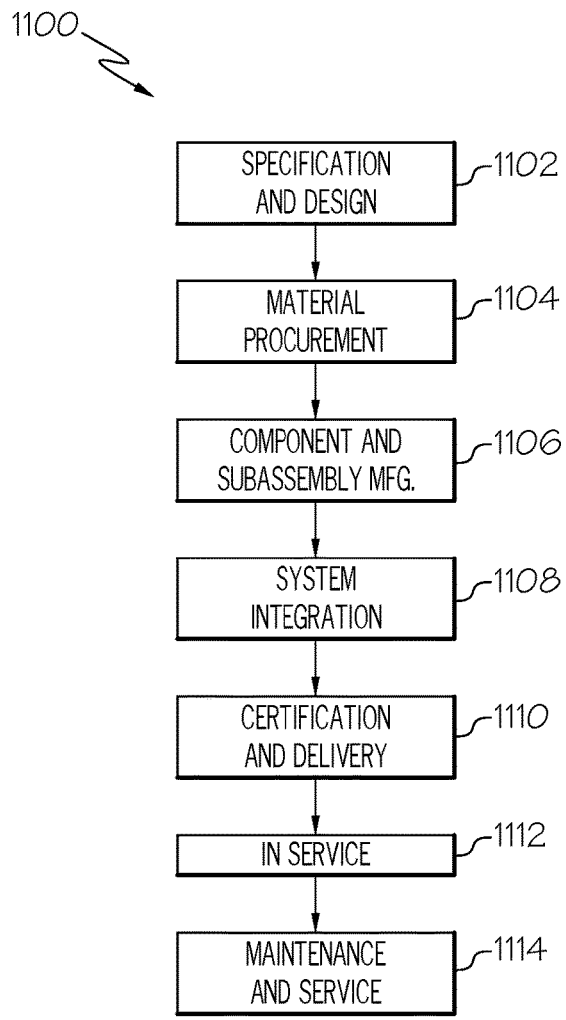
FIG. 14 is a block diagram of aircraft production and service methodology.

In FIGS. 13 and 14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13 and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "front," "rear," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Referring to FIG. 1, one embodiment of radar system 100 is disclosed. Generally, radar system 100 is deployable from or deployable on mobile platform 102. As general examples, mobile platform 102 may include a vehicle such as an air vehicle, a space vehicle, a marine vehicle, a land vehicle, etc. As one specific, non-limiting example, mobile platform 102 is aircraft 104. Aircraft 104 may be any type of manned or unmanned air vehicle including, but not limited to, a fixed-wing aircraft, a rotary-wing aircraft, an unmanned aerial vehicle ("UAV"), a spacecraft, a missile, a rocket, and the like.

While radar system 100 is described and illustrated herein with respect to air vehicles (e.g., aircraft 104), the examples disclosed herein may be equally applicable for sense and avoid and due regard detection in other types of vehicles such as land vehicles (e.g., cars, trucks, buses, trains, etc.) or marine vehicles (e.g., boats, submarines, hydrofoils, fluid flow conduits, etc.)

Beneficially, the disclosed radar system 100 includes two radar arrays that provide the ability to detect and track airborne objects or targets (e.g., aircraft) across a field of coverage. Radar system 100 may include radio frequency electronics and processors capable of tracking multiple targets while simultaneously continuing to scan for new targets within the field of coverage.

Figure 2:
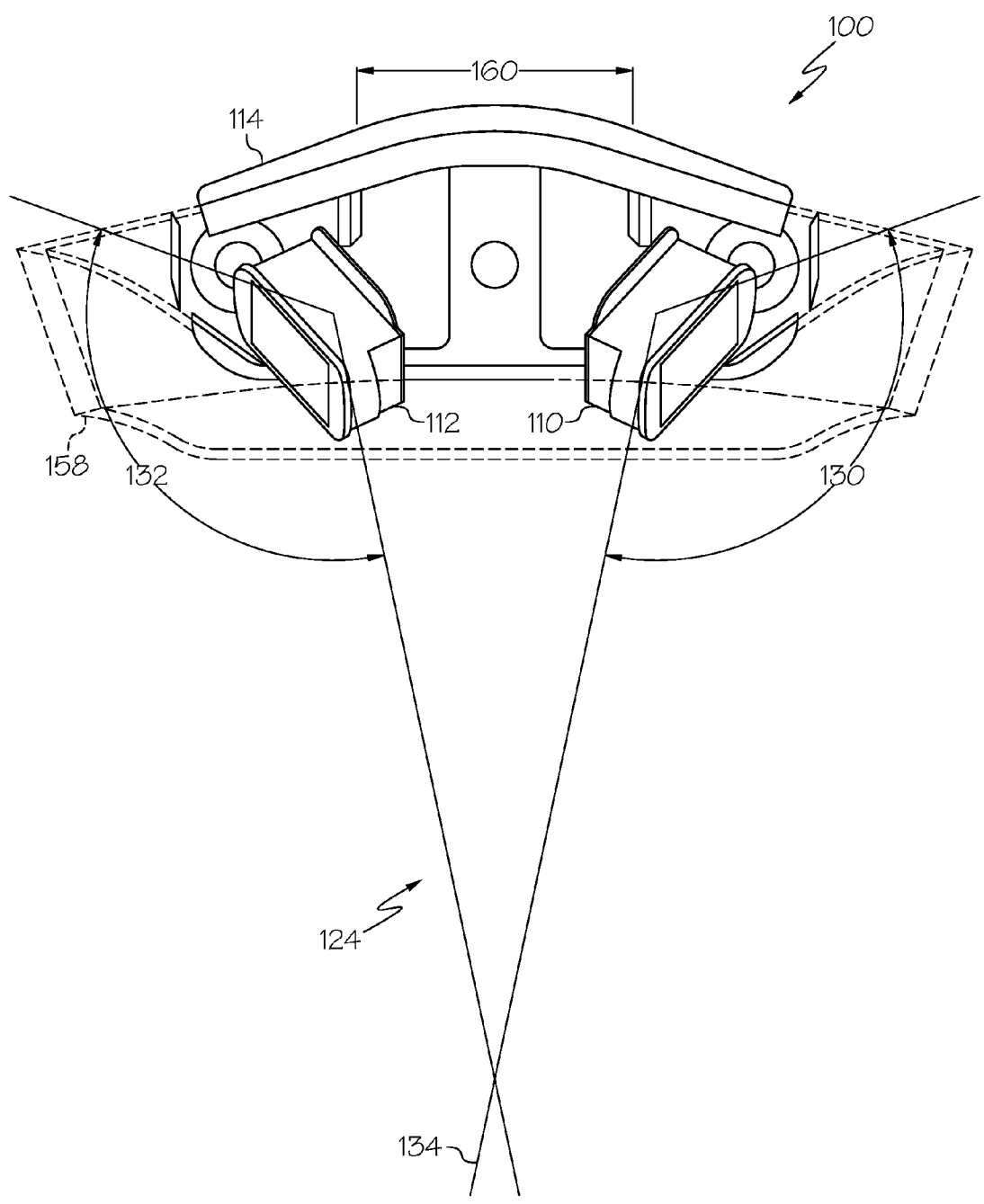
FIG. 2 is a schematic illustration of one example of the fields of coverage of the disclosed radar system.

Referring to FIG. 1, and with reference to FIG. 2, in one example, radar system 100 includes first radar array 110 and second radar array 112. First radar array 110 includes a plurality of first radiating elements (referred to herein as first radiating elements 116). Second radar array 112 includes a plurality of second radiating elements (referred to herein as second radiating elements 118). First radiating elements 116 and second radiating elements 118 may be any suitable antenna elements capable of transmitting and/or receiving electromagnetic waves (e.g., radio frequency energy).

Figure 3:
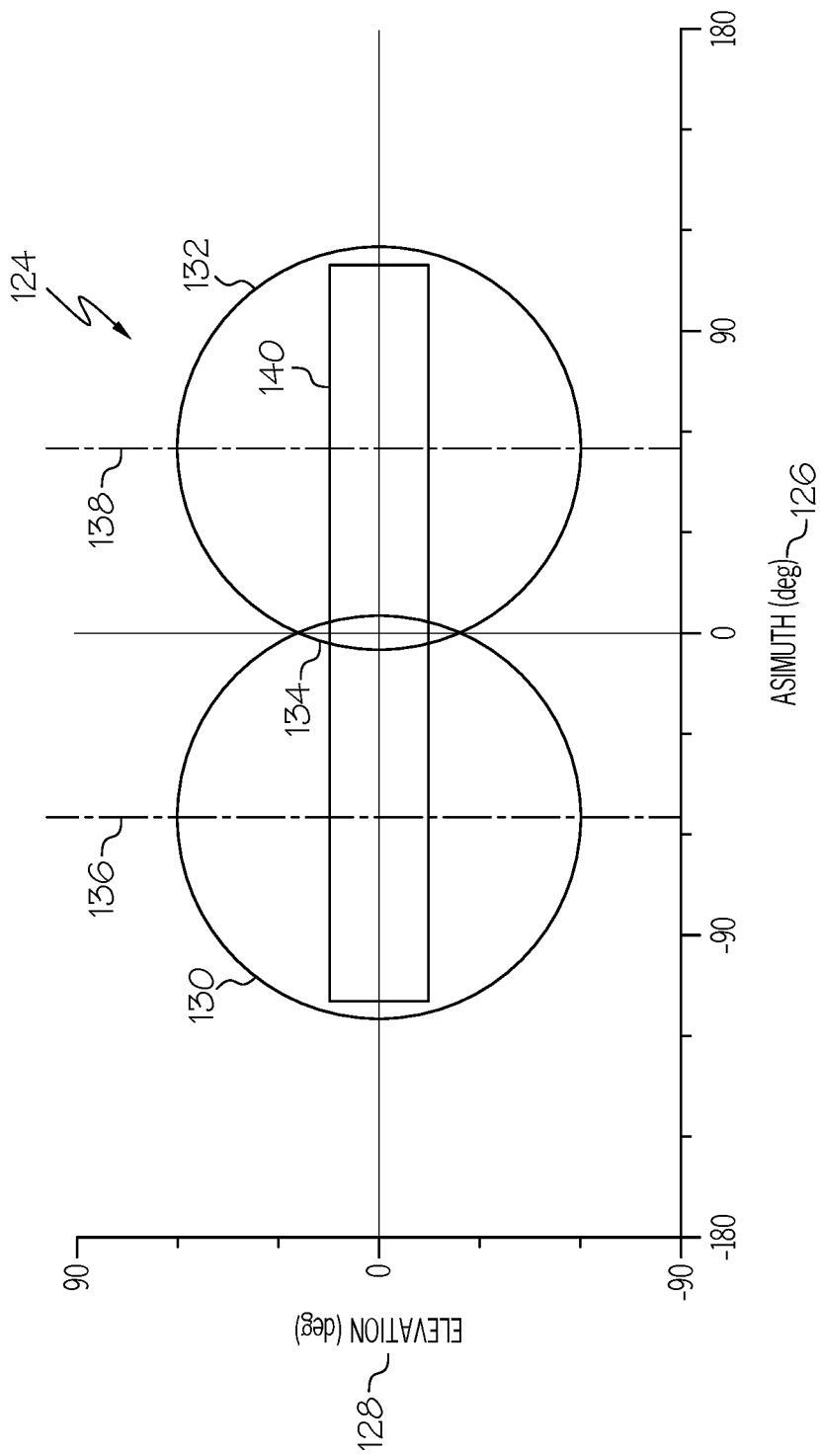
FIG. 3 is a schematic front perspective view of one example of the disclosed radar system.

Referring to FIG. 3, and with reference to FIGS. 1 and 2, in one example, first radar array 110 and second radar array 112 include (or define) combined field of coverage 124 having a predetermined range in an azimuth plane (referred to herein as azimuth 126) and in an elevation plane (referred to herein as elevation 128). As used herein, the term field of coverage may also be referred to as or understood as a field of regard of the radar array. In one example, combined field of coverage 124 is at least ±110 degrees in azimuth 126 and at least ±15 degrees in elevation 128 (referred to herein as minimum combined field of coverage 140) (FIG. 3). In other words, first radar array 110 and second radar array 112 include or provide minimum combined field of coverage 140 of at least 220 degrees in azimuth 126 and 30 degrees in elevation 128. In one example, combined field of coverage 124 is at least ±115 degrees in azimuth 126 and at least ±60 degrees in elevation 128. In other words, first radar array 110 and second radar array 112 include or provide combined field of coverage 124 of at least 230 degrees in azimuth 126 and at least 120 degrees in elevation 128.

Referring to FIG. 2, in one example, first radar array 110 and second radar array 112 include relative spacing 160. Relative spacing 160 may depend on various factors including, but not limited to, a volume constraint of radome 158 (e.g., the available interior volume), field of view requirements of radar system 100 (e.g., a combination of first field of coverage 130 and second field of coverage 132, and the like.

Referring to FIG. 3, and with reference to FIGS. 1 and 2, in one example, first radar array 110 includes first individual field of coverage 130 and second radar array 112 includes second individual field of coverage 132. First individual field of coverage 130 and second individual field of coverage 132 may each be defined by a radar cone or a shaped beam having a conical shape. First individual field of coverage 130 and second individual field of coverage 132 may be the same. First individual field of coverage 130 and second individual field of coverage 132 define combined field of coverage 124 (e.g., minimum combined field of coverage 140). In one example, first individual field of coverage 130 is at least ±60 degrees in azimuth 126 and at least ±60 in elevation 128. In other words, first radar array 110 includes or provides first individual field of coverage 130 of at least 120 degrees in azimuth 126 and 120 degrees in elevation 128. Similarly, in one example, second individual field of coverage 132 is at least ±60 degrees in azimuth 126 and at least ±60 in elevation 128. In other words, second radar array 112 includes or provides second individual field of coverage 132 of at least 120 degrees in azimuth 126 and 120 degrees in elevation 128.

Generally, first radar array 110 and second radar array 112 may be arranged and/or oriented to provide an at least partially overlapping field of coverage to enable or facilitate radar system 100 to detect an airborne object (not explicitly illustrated) within combined field of coverage 124.

Referring to FIG. 3, first radar array 110 (e.g., first individual field of coverage 130) includes first centerline 136 and second radar array 112 (e.g., second individual field of coverage 132) includes second centerline 138. In one example, first centerline 136 and second centerline 138 are oriented at a predetermined angle relative to one another to provide a partially overlapping field of coverage (referred to herein as overlapping field of coverage 134) within combined field of coverage 124. As one example, first centerline 136 and second centerline 138 are oriented at an angle of 110 degrees in azimuth 126 relative to one another to provide overlapping field of coverage 134 within combined field of coverage 124. As one example, first centerline 136 and second centerline 138 includes or provide overlapping field of coverage 134 of at least ±5 degrees in azimuth 126. Thus, the overlap may be at least 10 degrees, which results in the minimum elevation coverage at a centerline of aircraft 106 (that is 0 degrees azimuth with respect to airframe 106) being no less than ±15 degrees in elevation. In other words, overlapping field of coverage 134 is at least 10 degrees in azimuth 126. As one example, first centerline 136 (e.g., a vector normal to a base plane of first radar array 110) may be relatively oriented at −55 degrees in azimuth 126 and second centerline 138 (e.g., a vector normal to a base plane of second radar array 112) may be relatively oriented at +55 degrees in azimuth 126.

Figure 4:
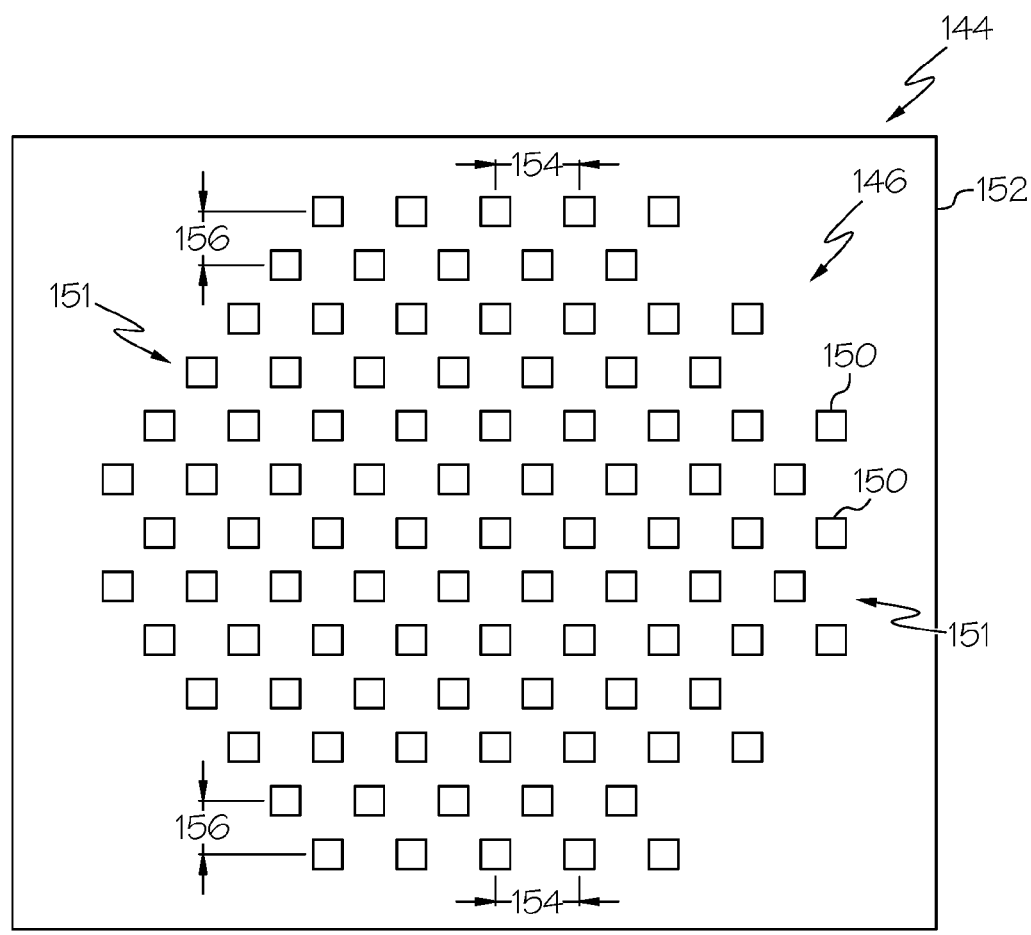
FIG. 4 is a schematic illustration, in plan view, of one example of a triangular lattice of a radar array.
Figure 5:
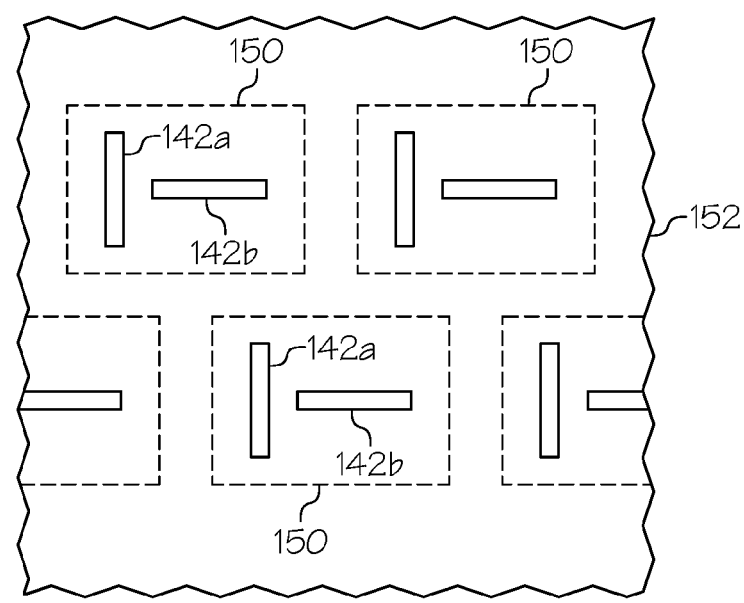
FIG. 5 is a schematic perspective view of one example of a sub-array of the radar array of FIG. 4.

Referring generally to FIGS. 4 and 5, first radiating elements 116 of first radar array 110 and second radiating elements 118 of second radar array 112 may be arranged having a predetermined relative spacing sufficient to facilitate a minimum number of radiating elements 142 forming radar array 144 required to provide combined field of coverage 124 (e.g., minimum combined field of coverage 140) (FIG. 3).

Referring to FIG. 1, in one example, first radiating elements 116 of first radar array 110 are arranged in first triangular lattice 120. Similarly, in one example, second radiating elements 118 of second radar array 112 are arranged in second triangular lattice 122.

Referring to FIGS. 4 and 5, and with reference to FIG. 1, radar array 144 may be one example of first radar array 110 and/or second radar array 112 (FIG. 1). Triangular lattice 146 of radiating elements 142 may be one example of first triangular lattice 120 of first radar array 110 and/or second triangular lattice 122 of second radar array 112 (FIG. 1). Radiating elements 142 (FIG. 5) may be one example of first radiating elements 116 and/or second radiating elements 118.

Referring to FIG. 4, in one example, radar array 144 includes triangular lattice 146. Triangular lattice 146 includes an arrangement of multi-element sub-arrays 150. In one example construction, staggered sub-arrays 150 are stacked in approximately parallel groups 151 (e.g., rows). Thus, in one example construction, there may not be a continuous panel the full size of radar array 144. However, in another example constructions, there may be a continuous panel the full size of radar array 144. As illustrated in FIG. 4, each one of sub-arrays 150 is staggered (e.g., offset) relative to a subjacent one (e.g., situated below) of sub-arrays 150 and a superjacent one (e.g., situated above) of sub-array 150. In one example, each one of groups 151 of sub-arrays 150 positioned progressively outward relative to a centerline (not explicitly illustrated) of radar array 144 include fewer sub-arrays 150 that an inwardly adjacent one of groups such that sub-arrays 150 form triangular lattice 146.

Referring to FIG. 5, in one example, each one of sub-arrays 150 (also referred to as sub-array 150) includes multiple (e.g., a pair of) radiating elements 142. As one example, sub-array 150 includes vertical radiating element 142a to provide vertical polarity and horizontal radiating element 142b to provide horizontal polarity. In one example construction, each one of sub-arrays 150 may include radiating elements 142 formed, coupled, or otherwise disposed on distribution board 152. In one example, radiating elements 142 may be made of a copper material. For example, radiating elements 142 may be a copper material printed, etched, or electro-chemically disposed on a surface of a substrate. Distribution board 152 may be any suitable dielectric material. As non-limiting examples, distribution board 152 may be made of a polyimide material, a ceramic material, a polytetrafluoroethylene ("PTFE") composite, a fiberglass reinforced composite, similar materials, or a combination thereof.

Referring to FIG. 4, and with reference to FIG. 5, radiating elements 142 of triangular lattice 146 of radar array 144 may be positioned at a predetermined relative spacing. For example, radiating elements 142 may be arranged and spaced relative to one another to facilitate electromagnetic radiation at a selected wavelength and/or polarity. Similarly, sub-arrays 150 may be arranged and spaced relative to one another to facilitate electromagnetic radiation at a selected wavelength and/or operating frequency.

In one example, sub-arrays 150 may have first (e.g., horizontal) spacing 154 of between approximately 0.40 inch and approximately 0.45 inch, for example, approximately 0.422 inch. In one example, sub-arrays 150 may have second (e.g., vertical) spacing 156 of between approximately 0.35 inch and approximately 0.40 inch, for example, approximately 0.365 inch.

Referring to FIG. 4, and with reference to FIGS. 1 and 5, triangular lattice 146 of radar array 144 may include a predetermined number of sub-arrays 150 and, thus, radiating elements 142, sufficient to provide a suitable individual field of coverage to radar array 144 to enable or facilitate a predetermined operative wavelength of radar array 144. In one example, triangular lattice 146 includes approximately 128 radiating elements 142. In one specific, non-limiting example, first triangular lattice 120 of first radar array 110 includes one hundred and twenty-eight (128) sub-arrays 150 (e.g., horizontal and vertical pairs of first radiating elements 116) and second triangular lattice 122 of second radar array 112 includes one hundred and twenty-eight (128) sub-arrays 150 (e.g., horizontal and vertical pairs of second radiating elements 118).

In one example, for control of beam steering functions, radiating elements 118 may be separated by a half of a wavelength (e.g., $\lambda/2$, where $\lambda$ is the wavelength corresponding to the frequency being transmitted). The choice of a triangular lattice allows the array surface dimensions (e.g., of first radar array 110 and/or second radar array 112) to be more compact than if the radiating elements were arranged in a square lattice configuration. Thus, the depth and spacing of radiating elements 118 are designed to the operating frequency of the radar arrays (e.g., first radar array 110 and/or second radar array 112).

Figure 7:
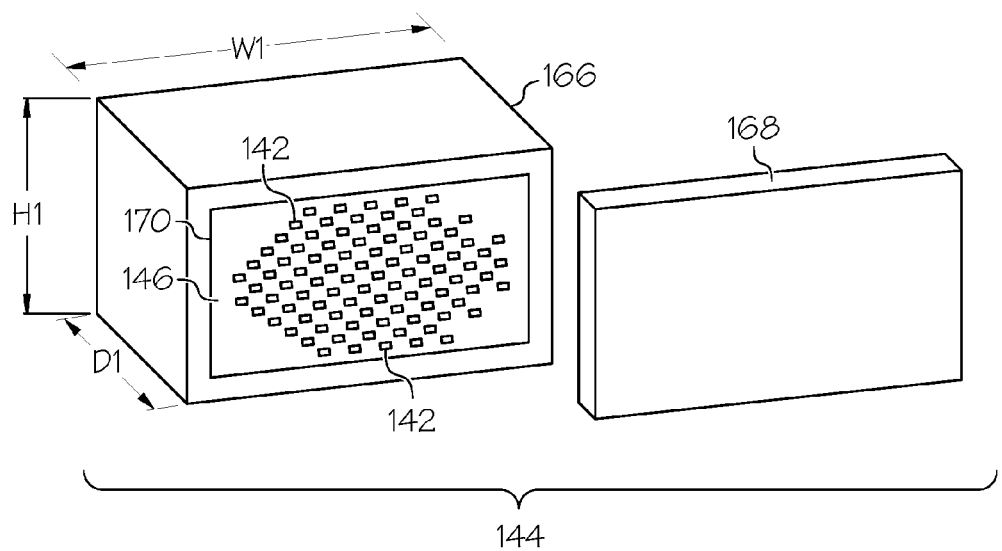
FIG. 7 is a schematic exploded perspective view of one example of the radar array.

Referring to FIG. 7, in one example, radar array 144 (e.g., first radar array 110 and/or second radar array 112) includes housing 166. Housing 166 defines a cavity (not explicitly illustrated) that is substantially closed and having aperture 170 in one side. As one example, housing 166 may generally be in the form of (e.g., have a shape of) a rectangular prism. Housing 166 may be made from any suitable conductive material, such as metal (e.g., aluminum).

Referring to FIG. 5, and with reference to FIG. 4, in one example, a plurality of substrates 148 are mounted (e.g., mechanically and electrically) to distribution board 152 in the staggered triangular arrangement. Distribution board 152 may be an electronic circuit board (e.g., a printed circuit board). Distribution board 152 may define a base plane of radar array 144. In one example construction, each individual radiating element 142 may be coupled or connected to a respective or associated connecting line (not explicitly illustrated) on a backside of distribution board 152 or within one or more conductive intermediate layers of distribution board 152, for example, by way of conducive paths (e.g., vias and/or traces) formed in or through distribution board 152.

Referring to FIG. 7, and with reference to FIGS. 4 and 5, in one example, triangular lattice 146 formed from substrates 148 having radiating elements 142 (e.g., plurality of sub-arrays 150) coupled to distribution board 152 is fit within the cavity defined by housing through aperture 170. In one example, the cavity behind triangular lattice 146 may be filled with air. In another example, the cavity may be filled with a dielectric material (e.g., a foam).

Referring to FIG. 7, in one example, (e.g., first radar array 110 and/or second radar array 112) includes cover 168. Cover 168 is provided in aperture 170 in front of triangular lattice 146. As one example, cover 168 is formed of a dielectric material suitably sized and shaped so that cover 168 completely closes aperture 170.

Figure 6:
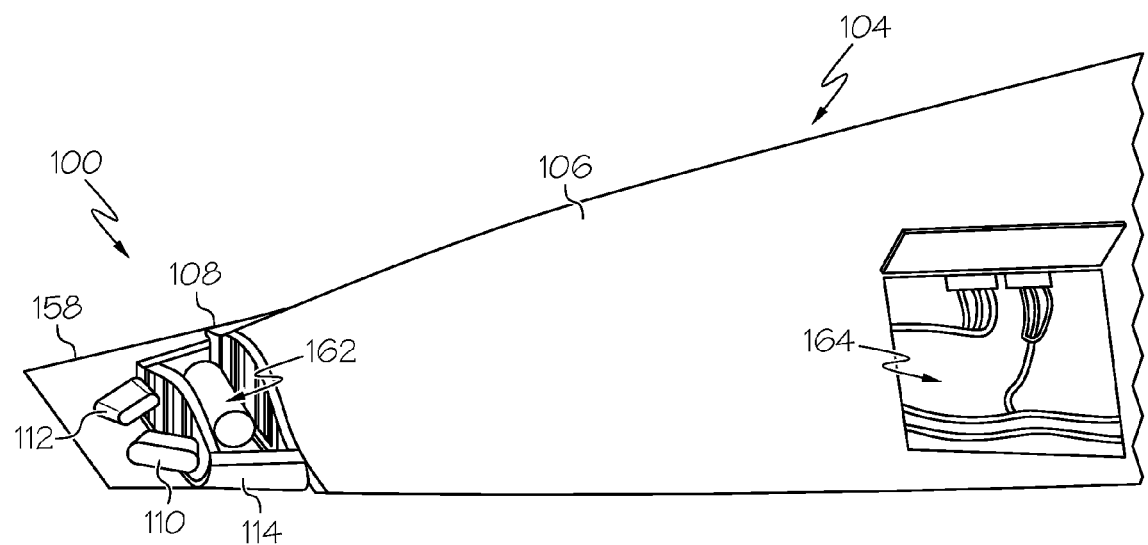
FIG. 6 is a schematic side elevation view of the disclosed radar system deployed on an aircraft.

Referring to FIG. 1, and with reference to FIG. 6, in one example, radar system 100 includes radio frequency ("RF") electronics 162. RF electronics 162 are coupled to first radar array 110 and second radar array 112. RF electronics 162 may feed first radar array 110 and second radar array 112 to transmit a particular type of RF energy.

Referring to FIG. 1, and with reference to FIG. 6, in one example, radar system 100 includes digital processor 164.

Referring to FIG. 6, and with reference to FIG. 1, in one example, radar system 100 may be disposed proximate (e.g., at or near) a forward end of aircraft 104. In one example, first radar array 110 and second radar array 112 are mounted within nose 108 of aircraft 104. Positioning first radar array 110 and second radar array 112 at the forward end, for example, within nose 108, of aircraft 104 provides a clear line of sight for both first radar array 110 and second radar array 112 and an unobstructed combined field of coverage 124 (e.g., minimum field of coverage 140) and overlapping field of coverage 134.

In one example, radar system 100 includes mounting fixture 114. Mounting fixture 114 may be attached to airframe 106 of aircraft 104 at nose 108. First radar array 110 and second radar array 112 are attached to mounting fixture 114. RF electronics 162 may be mounted behind mounting fixture 114 in nose 108. Digital processor 164 may be mounted within airframe 106, for example, aft of nose 108.

Generally, deployment of the disclosed radar system 100 on aircraft 104 may impose various size limitations, such as dimensional or volume limitations, weight limitations, power limitations, and the like on radar system 100. FIG. 8 illustrates one example of a size, weight, power, and cooling requirements table for one example of the disclosed radar system 100.

Referring to FIG. 8, as one example, each radar array 144 (e.g., first radar array 110 and/or second radar array 112) (FIG. 1) may have a weight of approximately 10 pounds, a power requirement of approximately 357.5 Watts, and a cooling power requirement of 127 Watts. In one example, radar system 100 may include a liquid cooling mechanism (not explicitly illustrated) to cool each radar array 144 and, optionally, RF electronics 162 and digital processor 164.

Referring to FIG. 8, and with reference to FIG. 7, as one example, each radar array 144 (e.g., housing 166, triangular lattice 146, and cover 168) may have a width W1 of between approximately 10 inches and approximately 11 inches, for example, between approximately 10 inches and approximately 10.5 inches, for example, approximately 10.3 inches. As one example, each radar array 144 may have a depth D1 of between approximately 5 inches and approximately 6 inches, for example, between approximately 5 inches and approximately 5.5 inches, for example, approximately 5.4 inches. As one example, each radar array 144 may have a height H1 of between approximately 3 inches and approximately 4 inches, for example, approximately 3.5 inches. As one example, each radar array 144 may have a volume of between approximately 380 in$^3$ and approximately 390 in$^3$, for example, approximately 386.8 in$^3$. Each of the first and second radar arrays 144 include a plurality of radiating elements 142 that are positioned in a triangular lattice arrangement with a relative horizontal spacing of between approximately 0.40 inch and approximately 0.45 inch and a vertical spacing of between approximately 0.35 inch and 0.40 inch. The first and second radar arrays 144 each have a height of between approximately 3.0 inches and approximately 3.5 inches and a length of between approximately 10 inches and approximately 10.5 inches, to establish sufficient area in which to include a minimum number of radiating elements 142 in the first and second radar arrays 144 to effectively establish a combined field of coverage of at least ±110 degrees in an azimuth plane and at least ±15 degrees in an elevation plane.

In one example, each of radar arrays 144 (e.g., first radar array 110 and/or second radar array 112) (FIG. 1) include a plurality of radiating elements 142 (e.g., a plurality of first radiating elements 116 and/or second radiating elements 116, respectively) that are positioned in a triangular lattice arrangement (e.g., triangular lattice 146) with a relative horizontal spacing of between approximately 0.40 inch and approximately 0.45 inch and a vertical spacing of between approximately 0.35 inch and 0.40 inch. Each one of radar arrays 144 (e.g., first and second radar arrays) have a height of between approximately 3.0 inches and approximately 3.5 inches and a length of between approximately 10 inches and approximately 10.5 inches, to establish sufficient area in which to include a minimum number of radiating elements 142 in the first and second radar arrays 144 to effectively establish a combined field of coverage of at least ±110 degrees in an azimuth plane and at least ±15 degrees in an elevation plane.

While specific, non-limiting examples of size, weight, power, and cooling requirements of the disclosed radar system 100 are described herein and illustrated with respect to FIG. 8, various other size, weight, power, and/or cooling requirements are also contemplated. A particular size, weight, power, and/or cooling requirement for radar system 100 in general, and radar array 144 in particular, may depend upon various factors including, but not limited to, the size, type, and/or shape of aircraft 104.

Generally, the overall size (e.g., L, W, H) of the radar arrays 144 (e.g., first radar array 110 and/or second radar array 112) are consistent with compact radar designs that provide functions that are intended to work at close-range to mid-range. Larger and circular-shaped apertures may be designed for long-range detection. Structural constraints of mobile platform 102 may limit the size of radar array 144 (e.g., first radar array 110 and/or second radar array 112) and/or the number of radiating elements 142 (e.g., first radiating elements 116 and/or second radiating elements 116) per radar array 144 (the spacing between radiating elements is a function of operating frequency).

Figure 9:
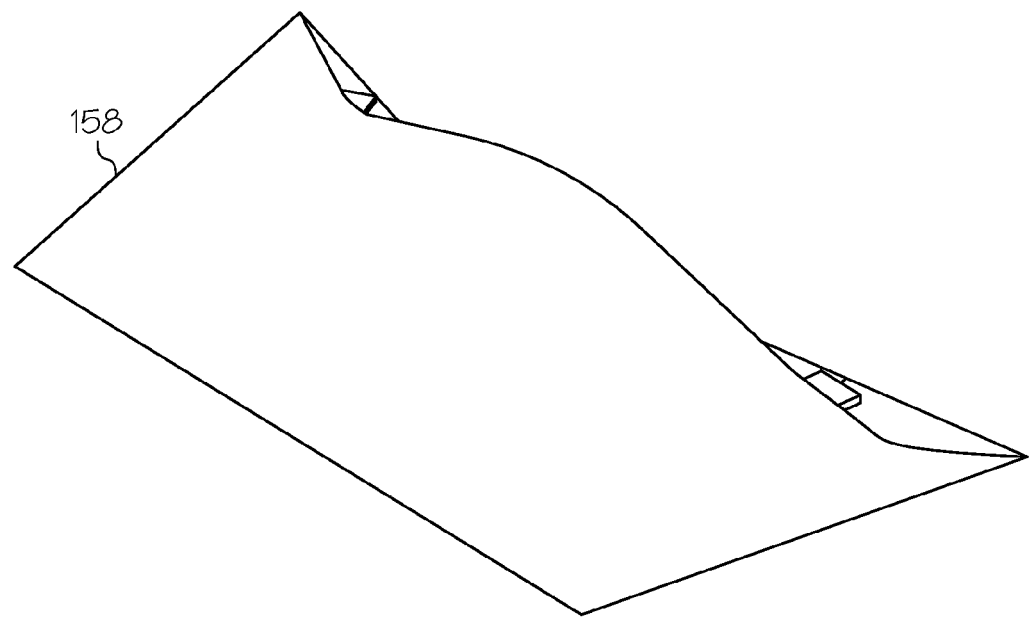
FIG. 9 is a schematic perspective view of one example of a radome of the disclosed radar system.
Figure 10:
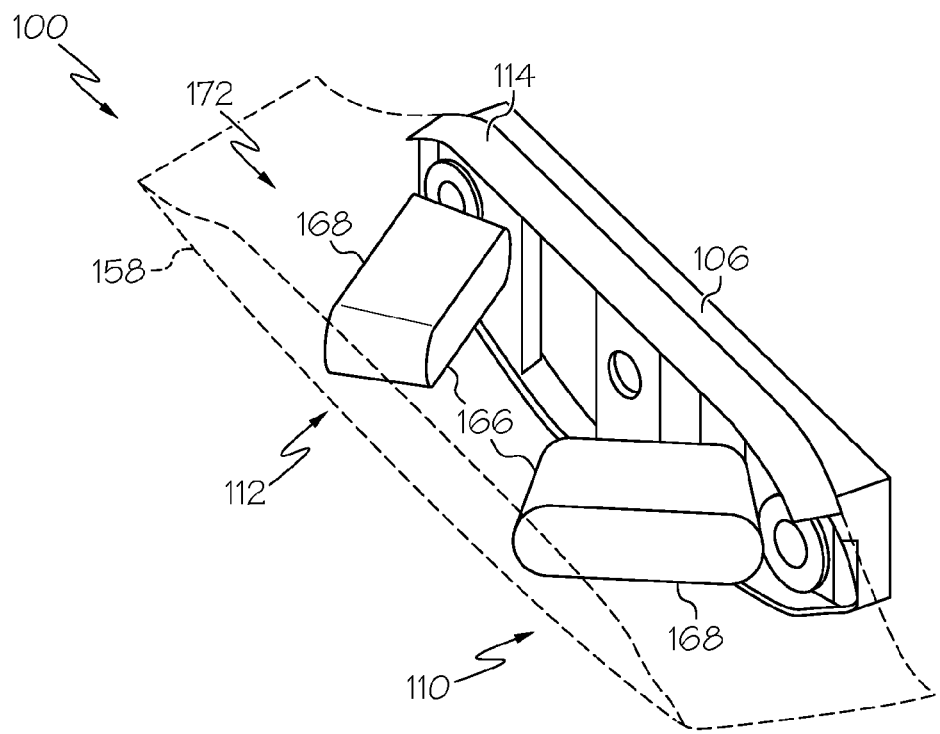
FIG. 10 is a schematic perspective view of one example of the disclosed radar system.

Referring to FIGS. 9 and 10, and with reference to FIGS. 1, 2 and 6, in one example, radar system 100 includes radome 158. First radar array 110 and second radar array 112 are located within interior 172 (FIG. 10) of radome 158. Radome 158 houses and protects first radar array 110 and second radar array 112. In one example, and as best illustrated in FIGS. 6 and 10, radome 158 may be attached to airframe 106 of aircraft 104 at nose 108.

Radome 158 may be made from a dielectric material. As one specific, non-limiting example, radome 158 includes at least one layer of quartz epoxy. As one specific, non-limiting example, radome 158 has a dielectric constant of between approximately 3 and approximately 4, for example, approximately 3.42. The particular dielectric material, dielectric constant, or number of material layers used to make radome 158 may vary depending upon a particular radar application, for example, a particular operating frequency of radar system 100.

Figure 11:
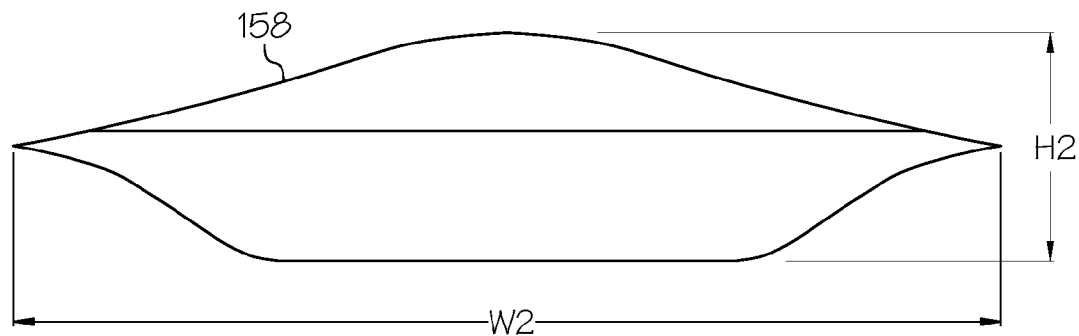
FIG. 11 is a schematic front elevation view of one example of the radome.
Figure 12:
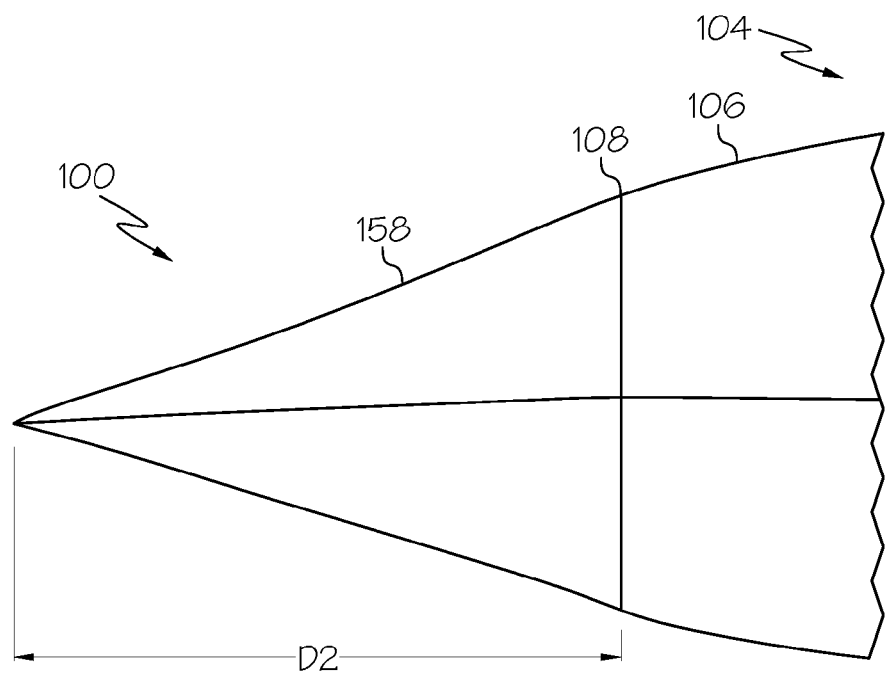
FIG. 12 is a side elevation view of one example of the radome.

Referring to FIGS. 11 and 12, in one example, radome 158 is conformal to nose 108 of aircraft 104. Radome 158 may include a size and/or shape substantially matching, for example, the profile of, and extending from nose 108 of aircraft 104. A particular size and/or shape of radome 158 may vary depending upon the size and/or type of aircraft 104 and/or the shape of airframe 106. In one specific, non-limiting example, aircraft 104 may be a pancake-style aircraft having an airframe 106 that converges or tapers toward the forward end of aircraft 104. For example, radome 158 may be a low profile conformal radome. In one example, radome 158 may be asymmetric in one or more of the width W2, depth D2, and/or height H2 dimensions. In a similar manner, and as best illustrated in FIGS. 11 and 12, radome 158 may taper from an aft (e.g., rear) end and a forward (e.g., front end).

As one non-limiting example, radome 158 may have a width W2 of between approximately 48 inches and approximate 52 inches. As one example, non-limiting example, radome 158 may have a depth D2 of between approximately 20 inches and 25 inches, for example approximately 22 inches. As one non-limiting example, radome 158 may have a height H2 of between approximately 10 inches and approximately 13 inches. As one example, non-limiting example, interior 172 of radome 158 may define a volume of between approximately 9,600 cubic inches and approximately 16,900 cubic inches.

The particular shape and/or materials used for radome 158 may be selected based, for example, on a particular (e.g., desired) beam pattern of first radar array 110 and second radar array 112.

Referring to FIG. 13, and with reference to FIG. 1, one embodiment of method 200 is disclosed. Method 200 is one example implementation of a method for providing a due regard sense and avoid radar signal having a selected field of coverage and in a selected radar band. Modifications, additions, or omissions may be made to method 200 without departing from the scope of the present disclosure. Method 200 may include more, fewer, or other steps. Additionally, steps may be performed in any suitable order.

In one example implementation, method 200 includes the step of providing first radar array 110 and second radar array 112, as shown at block 202. As one example, first radar array 110 and second radar array 112 may be mounted to nose 108 of airframe 106 of aircraft 104 behind conformal radome 158.

In one example implementation, method 200 includes the step of orienting first centerline 136 of first radar array 110 and second centerline 138 of second radar array 112 at an angle of 110 degrees in azimuth 126 relative to one another, as shown at block 204.

In one example implementation, method 200 includes the step of providing combined field of coverage 124 (e.g., minimum field of coverage 140) of at least ±110 degrees in azimuth 126 and at least ±15 degrees in elevation 128, as shown at block 206.

In one example implementation, method 200 includes the step of providing overlapping field of coverage 134 of at least ±5 degrees in azimuth 126, as shown at block 208.

Accordingly, the disclosed radar system and method beneficially provide two compact arrays of radiating elements that are oriented relative to one another to provide a minimum field of coverage sufficient to meet the requirements of sense and avoid sensors and due regard sensors. Further, the disclosed radar system and method beneficially provide radar arrays that are designed to fit within a conformal radome and meet stringent size, weight, power, and cooling requirements.

Examples of systems, apparatus, and methods disclosed herein may be described in the context of aircraft manufacturing and service method 1100 as shown in FIG. 14 and aircraft 1200 as shown in FIG. 15. Aircraft 1200 may be an example of aircraft 104 (FIG. 1).

During pre-production, the illustrative method 1100 may include specification and design, as shown at block 1102, of aircraft 1200, which may include design of airframe 1202 (e.g., airframe 106), radar system 100 (e.g., first radar array 110, second radar array 112, and/or radome 158) and material procurement, as shown at block 1104. During production, component and subassembly manufacturing, as shown at block 1106, and system integration, as shown at block 1108, of aircraft 1200 may take place. Radar system 100 as described herein may be incorporated as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1200 produced by illustrative method 1100 may include airframe 1202 (e.g., airframe 106 having nose 108), and a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while aircraft 1200 is in service (block 1112) and during maintenance and service stage (block 1114).

Although various examples of the disclosed apparatus, systems, and methods have been shown and described, modifications may occur to those skilled in the art upon reading the specification. The present application includes such modifications and is limited only by the scope of the claims.

What is claimed is:

1. A radar system comprising:
   a first radar array comprising:
      a first housing, defining a closed first cavity and a first aperture;
      a first planar array of a plurality of first radiating elements located in said first cavity; and
      a first cover located in said first aperture, in front of said first planar array;
   a second radar array comprising:
      a second housing, defining a closed second cavity and a second aperture;
      a second planar array of a plurality of second radiating elements located in said second cavity; and
      a second cover located in said second aperture, in front of said second planar array; and
   a radome, wherein said first radar array and said second radar array are located in said radome, and
   wherein said first radar array and said second radar array have a combined field of coverage of at least ±110 degrees in an azimuth plane and at least ±15 degrees in an elevation plane and provide a partially overlapping field of coverage of at least 10 degrees in said azimuth plane.

2. The system of claim 1 wherein:
   said first radar array and said second radar array each has an individual field of coverage of at least ±60 degrees in said azimuth plane and at least ±60 in said elevation plane; and
   said combined field of coverage is at least ±115 degrees in said azimuth plane and at least ±60 degrees in said elevation plane.

3. The system of claim 1 wherein:
   said plurality of first radiating elements and said plurality of second radiating elements each comprises 128 radiating elements arranged in a triangular lattice; and
   said plurality of first radiating elements and said plurality of second radiating elements each comprises a horizontal spacing of between approximately 0.40 inch and approximately 0.45 inch and a vertical spacing of between approximately 0.35 inch and 0.40 inch.

4. The system of claim 1 wherein said first radar array and said second radar array each comprises a height of between approximately 3.0 inches and approximately 3.5 inches and a length of between approximately 10 inches and approximately 10.5 inches.

5. The system of claim 1 further comprising:
   a mounting fixture configured to couple said first antenna radar array and said second radar array to a nose of an aircraft; and
   radio frequency electronics coupled to said mounting fixture behind said first antenna radar array and said second radar array, wherein:
   said radome is a conformal radome coupled to said nose of said airframe; and
   said first antenna radar array, said second radar array, said mounting fixture, and said radio frequency electronics are located in said conformal radome.

6. The system of claim 5 wherein said conformal radome is conformal to and extends from said nose of said aircraft and comprises a profile shape that tapers from an aft end of said conformal radome to a forward end of said conformal radome.

7. The system of claim 1 wherein a first centerline of said first radar array and a second centerline of said second radar array are oriented at an angle of 110 degrees in said azimuth plane relative to one another.

8. The system of claim 1 wherein said first cavity of said first housing and said second cavity of said second housing are filled with air.

9. The system of claim 1 wherein said first cavity of said first housing and said second cavity of said second housing are filled with a dielectric material.

10. The system of claim 1 wherein said first cover and said second cover are formed of a dielectric material.

11. An aircraft comprising:
    an airframe;
    a first radar array coupled to said airframe, said first radar array comprising:
       a first housing, defining a closed first cavity and a first aperture;

a first planar array of a plurality of first radiating elements located in said first cavity; and a first cover located in said first aperture, in front of said first planar array; and a second radar array coupled to said airframe, said second radar array comprising:

a second housing, defining a closed second cavity and a second aperture;

a second planar array of a plurality of second radiating elements located in said second cavity;

a second cover located in said second aperture, in front of said second planar array; and a radome coupled to said airframe, wherein said first radar array and said second radar array are located in said radome, and wherein said first radar array and said second radar array have a combined field of coverage of at least ±110 degrees in an azimuth plane and at least ±15 degrees in an elevation plane and provide a partially overlapping field of coverage of at least 10 degrees in said azimuth plane.

12. The aircraft of claim 11 wherein:

said first radar array and said second radar array each comprises an individual field of coverage of at least ±60 degrees in said azimuth plane and at least ±60 in said elevation plane; and said combined field of coverage of at least ±115 degrees in said azimuth plane and at least ±60 degrees in said elevation plane.

13. The aircraft of claim 11 wherein:

said plurality of first radiating elements and said plurality of second radiating elements each comprises 128 radiating elements arranged in a triangular lattice; and said plurality of first radiating elements and said plurality of second radiating elements each comprises a horizontal spacing of between approximately 0.40 inch and approximately 0.45 inch and a vertical spacing of between approximately 0.35 inch and 0.40 inch.

14. The aircraft of claim 11 wherein said first radar array and said second radar array each comprises a height of between approximately 3.0 inches and approximately 3.5 inches and a length of between approximately 10 inches and approximately 10.5 inches.

15. The aircraft of claim 11 further comprising:

a mounting fixture coupled to a nose of said aircraft, wherein said first radar planar array and said second radar planar array are coupled to said mounting fixture; and radio frequency electronics coupled to said mounting fixture behind said first antenna radar array and said second radar array, and wherein:

said radome is coupled to said nose of said airframe; and said first antenna radar array, said second radar array, said mounting fixture, and said radio frequency electronics are located in said conformal radome.

16. The aircraft of claim 15 wherein:

said radome extends from and is conformal to said nose of said aircraft; and said radome comprises a profile shape that tapers from an aft end of said radome to a forward end of said radome.

17. The aircraft of claim 11 wherein a first centerline of said first radar array and a second centerline of said second radar array are oriented at an angle of 110 degrees in said azimuth plane relative to one another.

18. The aircraft of claim 11 wherein:

said radome is formed of a dielectric material;

said first cavity of said first housing and said second cavity of said second housing are filled with at least one of air and said dielectric material; and said first cover and said second cover are formed of aid dielectric material.

19. A method comprising:

mounting a first radar array to an airframe of an aircraft, wherein said first radar array comprises:

a first housing, defining a closed first cavity and a first aperture;

a first planar array of a plurality of first radiating elements located in said first cavity; and a first cover located in said first aperture, in front of said first planar array;

mounting a second radar array to said airframe, wherein said second radar array comprises:

a second housing, defining a closed second cavity and a second aperture;

a second planar array of a plurality of second radiating elements located in said second cavity; and a second cover located in said second aperture, in front of said second planar array;

orienting said first radar array and said second radar array to provide a combined field of coverage of at least ±110 degrees in said azimuth plane and at least ±15 degrees in an elevation plane and to provide an overlapping field of coverage of at least ±5 degrees in said azimuth plane; and mounting a radome to said airframe, enclosing said first radar array and said second radar array.

20. The method of claim 19 further comprising orienting a first centerline of said first radar array and a second centerline of said second radar array at an angle of 110 degrees in said azimuth plane relative to one another, wherein said first radar array and said second radar array each has an individual field of coverage of at least ±60 degrees in said azimuth plane and at least ±60 in said elevation plane.

* * * * *